Patented Jan. 21, 1936

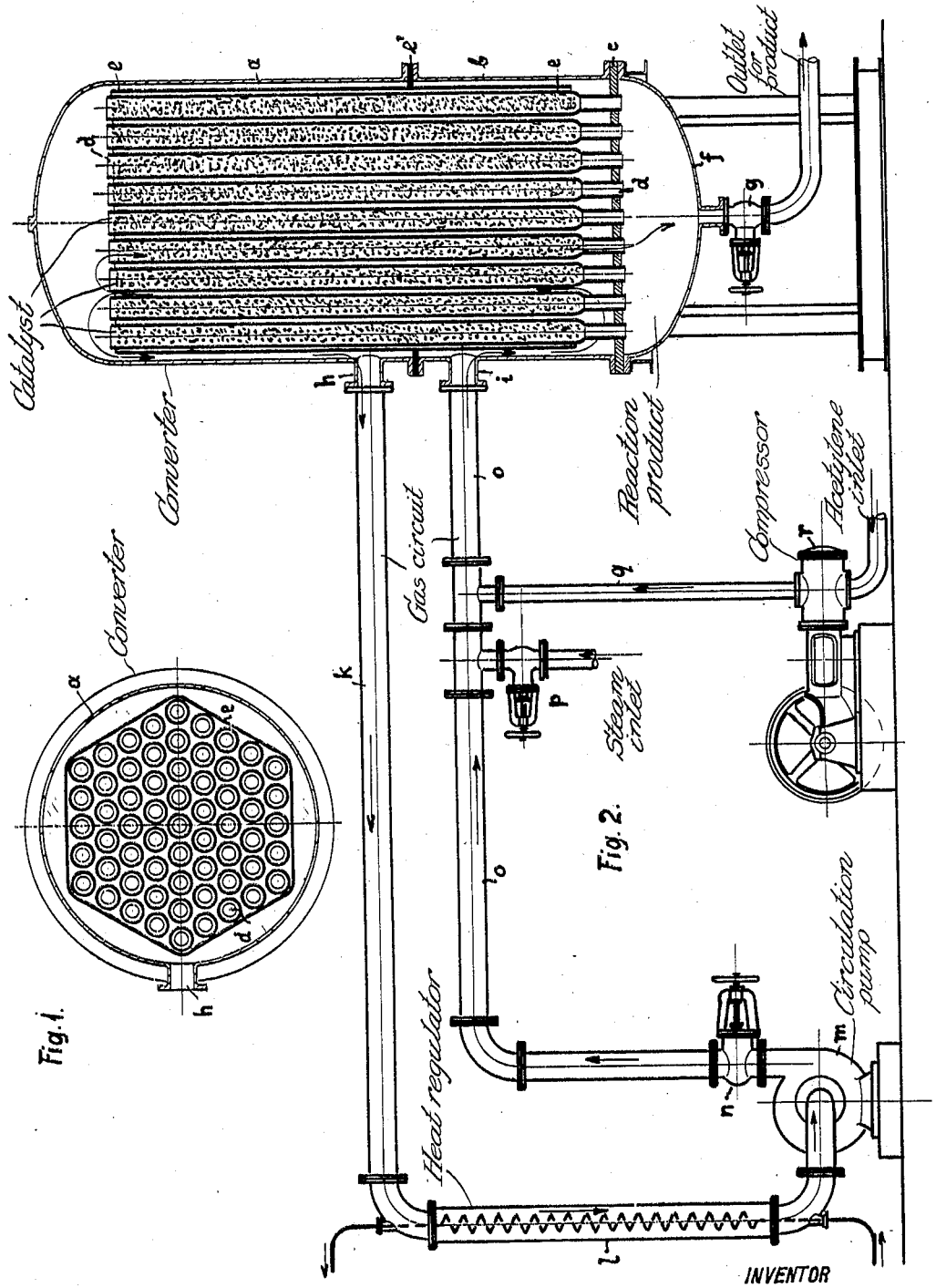

2,028,684

UNITED STATES PATENT OFFICE 2,028,684

METHOD OF AND AN APPARATUS FOR SUBJECTING A FLOWING MEDIUM IN A CONTINUOUS OPERATION TO A REACTION

Walter Pohl, Bruchhausen/Husten, Germany, assignor, by mesne assignments, to the firm of Deutsche Gold- und Silber Scheideanstalt vormals Roessler, Frankfort-on-the-Main, Germany, a corporation of Germany Application January 16, 1930, Serial No. 421,230
In Germany January 18, 1929

10 Claims. (Cl. 23—288)

My invention relates to a method of and an apparatus for subjecting a flowing medium in a continuous operation to a reaction producing or consuming heat, more particularly to a catalytic reaction, and has for its primary object an improved control of the temperature generated in the medium in the course of said reaction.

It has been suggested prior to my invention to continuously conduct the medium, before subjecting it to the reaction, past and in heat-exchange relation to the vessel in which the medium undergoes the reaction and, subsequently, through a cooling device in order to reduce the increase in temperature which take place during the reaction. For this purpose, the conduit supplying the medium to the vessel was arranged to surround the same. Such an arrangement is described, for instance, in the patent to Knietsch No. 688,020, issued December 3rd, 1901. As in this method the reacting medium was brought in heat-exchange relation with the supplied medium during the limited period of a single passage through the apparatus only, the relation of the periods of presence of the media in the reaction chamber and in the heat exchange device could not be varied within a given apparatus and the effect obtained was not very satisfactory. On the one hand, the flow speed of the supplied medium could not be increased without reducing said period and thereby adversely affecting the heat-exchange and, on the other hand, the temperatures prevailing in the reaction vessel and in the admission conduit were equalized to a limited extent only. Moreover, the heat-exchange was bound to take place primarily near the point of entry of the medium or media supplied in cold state to the heat-exchanger because at this point the temperature gradient is greater than at the point where the medium leaves the same. Hence, substantial differences in the temperature prevailing within the reaction vessel at different points were unavoidable.

Numerous chemical methods, however, demand that the temperature of the medium undergoing the reaction be kept between very narrow limits. This makes it an imperative requirement that the temperatures prevailing within the reaction vessel at various points be kept as uniform as possible.

I have found that this object may be achieved with a remarkable perfectness by circulating the medium prior to subjecting it to the reaction in heat-exchange relation with part of the medium which undergoes the reaction. The circulation of the medium permits of keeping it in heat-exchange relation with the content of the reaction vessel for any desired period, whereby the tendency of a change in the temperature of the medium during the reaction is very efficiently counteracted.

Moreover, the throughput of the medium may be varied without at the same time varying the temperature conditions if the speed of circulation is properly regulated.

My novel apparatus for carrying out this method comprises a circuitous conduit in which a pump is inserted to circulate a medium and which is arranged in intimate contact with the reaction vessel. A source of said medium is connected to the conduit and the latter communicates with the reaction vessel for continuous discharge into the same of a certain amount of the circulating medium. Thus, it will be seen that the medium is continually circulated in heat-exchange relation to the reacting medium and functions as a heat-carrier equalizing the temperature prevailing in different points of the reaction vessel.

My invention is applicable to endothermic as well as to exothermic reactions and to media of gaseous, liquid or semi-liquid nature. It is useful in cases where a number of media of similar or different nature are caused to react with one another with or without the use of a catalyst.

Other more specific objects of my invention will appear from the description following hereinafter and the features of novelty will be pointed out in the claims.

For a better understanding of my invention I shall describe its application to a method of converting a mixture of acetylene and water vapors to acetone.

A preferred form of an apparatus designed for this purpose and embodying my invention is shown in the accompanying drawing.

Fig. 1 illustrates a cross-section through the converter, and

Fig. 2 is an elevation of the apparatus, the converter being shown in axial section.

The converter comprises a casing consisting of an upper section $a$, a lower section $b$ and a cover $f$ provided with suitable flanges and bolted to each other in the manner illustrated in Fig. 2. Within this casing a hexagonal cylinder $e$ is enclosed which is provided with a peripheral flange $e'$ clamped between the casing sections $a$ and $b$ and which surrounds a multiplicity of parallel open-ended tubes $d$ filled with a suitable catalyst. The reduced lower ends of these tubes $d$ are mounted in the holes of a perforated plate $c$ which is inserted between and held in place by the flanges of the section b and the cover f. The latter is provided with an outlet wherein a reducing valve g is inserted.

Thus, it will be seen that the interior of the section b communicates with that of section a through the free space left between the tubes d and the wall of the hexagonal cylinder e. In order to carry out my method, I continuously circulate the mixture through the sections a and b before conducting it through the tubes d and subjecting it to the catalytic reaction. For this purpose, the section a is provided with a pipe-connection h wherefrom a pipe k leads to a suitable heat-regulating device, such as a tube l traversed by a pipe-coil to which a cooling medium, for instance cold water, is fed. The other end of the cooler l is connected to the admission port of a rotary pump m which discharges into a pipe o leading to a pipe-connection i of the lower section b of the converter casing. Thus, it will be seen, that the free space between the tubes d and the walls of the cylinder e forms part of a closed conduit which is completed by the parts k, l, m and o. In this conduit the mixture is circulated by operation of the pump m. The speed of circulation may be controlled by means of a valve n inserted in the pipe o.

The media which are to be subjected to the catalytic reaction are admitted to the pipe o from a suitable source. In the embodiment shown, water vapors are admitted through a valve p and acetylene is supplied by means of a suitable compressor r of the variable speed type.

The operation of the apparatus is as follows:
The compressor r is operated to supply acetylene at a normal temperature to the pipe o under a pressure of about 5 atm., that is to say, about 70 pounds per square inch. At the same time, saturated steam of the same pressure is admitted through the valve p. As the pump m is operated, the mixture enters through the pipe connection i the annular space provided for between the casing section b and the hexagonal cylinder e and flows in downward direction to subsequently pass upwardly through the free space between the tubes d and the cylinder e, as indicated by the arrows in Fig. 2. The major part of the mixture thus entering the space at the top of the section a descends through the annular space between the latter and the cylinder e and returns to the pump m through the pipe k and the cooler l.

However, a certain amount of the mixture entering the top of the section a corresponding in quantity to the amount continually admitted to the pipe o through the admission ports p and q, enters the tubes d and passes through the catalytic contact material therein in downward direction and is thus converted to acetone by way of a reaction producing so much heat as to raise the temperature within the tubes d to about 440° C. The circulating mixture takes up a part of the heat and assumes a temperature of about 420° C.

The product issuing from the lower ends of the tubes d is collected in the cover f and discharged through the reduction valve g which is adjusted to maintain the pressure prevailing in the apparatus at about 70 pounds per square inch.

The cooler l is so operated as to slightly reduce the temperature of the circulating mixture to a degree which will result in a temperature of about 380° C. prevailing in the pipe connection i.

As the nature of the contact material employed and the method of initiating the reaction are well known in the art, a description thereof need not be given herein.

The speed of circulation and the speed of admission through the ports p and q may be regulated in any desired manner by adjustment of the valves g and n and the ratio of the mixture of acetylene with water vapors may be controlled by suitably setting the valve p.

The temperatures mentioned heretofore are merely given by way of example and I wish it to be understood that with different ratios of mixture and with a different admission speed in relation to the circulating speed better results may be obtained with different temperatures which may be easily determined by experiments.

From the foregoing description it will be apparent that the vessel composed of the sections a, b, and f is constructed as a heat-exchange device divided into a reaction chamber proper formed by the interior of the tubes d and into a heat control chamber constituted by the free space between and above the tubes d. The mixture is continually circulated through the heat-control chamber past the heat-exchanging walls of the tubes d wherein the reaction takes place and is thus caused to function as a heat-carrier conveying the heat from the points of higher temperature to the points of lower temperature. Hence, a nearly uniform temperature gradient is secured over the whole length of the tubes d and the temperature prevailing at their opposite ends will be equalized to a very high extent. The high circulating speed which materially improves the heat transfer greatly contributes to this result, which is further improved by circulating the medium in a compressed state. Owing to the decreased specific volume of the compressed medium, the power consumption of the pump m is materially smaller than would be the case with a medium at normal pressure, and the increased density of the medium promotes the heat-transfer.

My invention is in no way limited to the use of the specific apparatus shown in the drawing although the same embodies the advantage of simplicity and efficiency.

While in the described apparatus the circulating mixture is conducted in contra-flow relative to reacting part of the medium, a different arrangement may be preferred under certain conditions. Moreover, it may be preferable sometimes to arrange the closed path of the circulating medium in other than parallel relation to the path of that part of the medium which undergoes the reaction, or not to mix the constituents until after they have been circulated in heat-exchange relation to the reacting mixture. Numerous other variations as will easily occurs to anyone skilled in the art may be adopted without departing from the spirit of my invention.

What I claim is:—

1. The process of regulating the temperature in a reaction chamber containing a catalyst for fluid reactants which comprises continuously circulating a fluid stream containing said reactants along the exterior of a heat-conducting surface of said chamber in intimate and indirect heat exchange relation with said catalyst and with reactants undergoing reaction, withdrawing an arbitrary and minor quantity of reactants from said circulating stream at substantially catalyzing temperature, passing said withdrawn portion through said catalyst, and introducing a corresponding quantity of fluid containing fresh reactants into said circulating stream.

2. The process of regulating the temperature in a reaction chamber containing a catalyst for fluid reactants which comprises continuously circulating a fluid stream containing said reactants in a closed path, continuously branching off a minor part of said stream at substantially catalyzing temperature and subjecting it to catalytic action while keeping it in intimate and indirect heat exchange relation with said circulating fluid stream and continuously supplying fluid containing fresh reactants to said closed path to compensate for said minor part which has been branched off.

3. The process of regulating the temperature in a reaction chamber containing a catalyst for fluid reactants which comprises continuously circulating a fluid stream containing said reactant in a closed path, continuously passing said stream in intimate and indirect heat exchange relation to a catalyst but out of direct contact therewith, continuously withdrawing a minor and arbitrary quantity of said stream at substantially catalyzing temperature, and passing it in direct contact with said catalyst to cause the occurrence of a reaction, and continuously introducing fluid containing fresh reactants into said circulating stream in said closed path to compensate for the withdrawn minor part.

4. The process of regulating the temperature in a reaction chamber containing a catalyst for fluid reactants which comprises circulating a fluid stream containing reactants in a closed path including a reaction chamber containing a catalyst, causing said stream to flow substantially parallel to a flow of fluid through said catalyst, reversing said flow to cause the stream to flow countercurrent to the flow of fluid through the catalyst and in heat exchange relation therewith, branching off a minor part of said stream and causing it to pass through and in direct contact with said catalyst in order to effect the chemical reaction, reversing the flow of the major part of said stream and causing it to pass in direct contact with the wall of said reaction chamber, regulating the temperature of said remaining stream and supplying fluid containing fresh reactants to said circulating stream in said closed path to compensate for the withdrawn minor part.

5. The process of regulating the temperature in a reaction chamber containing a catalyst for fluid reactants which comprises continuously circulating a fluid stream containing said reactants along the exterior of a heat-conducting surface of said chamber in intimate and indirect heat exchange relation with said catalyst and with reactants undergoing reaction, withdrawing an arbitrary and minor quantity of reactants from said circulating stream at substantially catalyzing temperature, passing said withdrawn portion through said catalyst, regulating the temperature of the circulating stream after the aforesaid withdrawal, and introducing a corresponding quantity of fluid containing fresh reactants into said circulating stream.

6. The process set forth in claim 1 in which the fluid reactants or gases are under pressure.

7. The process set forth in claim 1 in which the reactants are acetylene and water vapors which are adapted to be converted to acetone in the presence of the catalyst.

8. A converter for catalytic reactions which comprises an outer casing, a plurality of parallel open-ended tubes for catalyst mounted within said casing, an open-ended cylinder surrounding said tubes and extending close to the interior of said casing from regions adjacent to one end of said tubes to the other end of said tubes, a flange located at an intermediate region of said casing and extending from the interior thereof to the exterior of said cylinder to prevent the passage of fluid, a perforated plate positioned near the bottom of said casing for holding the ends of said tubes, an inlet for introducing a fluid stream containing reactants connected to said casing on one side of the flange, an outlet for withdrawing said fluid stream connected to said casing on the other side of said flange, and means associated with said casing underneath said perforated plate for removing catalyzed product.

9. A converter for catalytic reactions which comprises an outer casing, a plurality of parallel open-ended tubes for catalyst mounted within said casing, an open-ended cylinder surrounding said tubes and extending close to the interior of said casing from regions adjacent to one end of said tubes to the other end of said tubes, a flange located at an intermediate region of said casing and extending from the interior thereof to the exterior of said cylinder to prevent the passage of fluid, a perforated plate positioned near the bottom of said casing for holding the ends of said tubes, an inlet for introducing a fluid stream containing reactants connected to said casing on one side of the flange, an outlet for withdrawing said fluid stream connected to said casing on the other side of said flange, means associated with said casing underneath said perforated plate for removing catalyzed product, a closed conduit connected to said inlet and outlet, and a pump interposed in said conduit.

10. A converter for catalytic reactions which comprises an outer casing, a plurality of parallel open-ended tubes for catalyst mounted within said casing, an open-ended cylinder surrounding said tubes and extending close to the interior of said casing from regions adjacent to one end of said tubes to the other end of said tubes, a flange located at an intermediate region of said casing and extending from the interior thereof to the exterior of said cylinder to prevent the passage of fluid, a perforated plate positioned near the bottom of said casing for holding the ends of said tubes, an inlet for introducing a fluid stream containing reactants connected to said casing on one side of the flange, an outlet for withdrawing said fluid stream connected to said casing on the other side of said flange, means associated with said casing underneath said perforated plate for removing catalyzed product, a closed conduit connected to said inlet and outlet, temperature regulating means associated with said conduit, and a pump interposed in said conduit.

WALTER POHL.